United States Patent [19]
Harris, Jr.

[11] Patent Number: 4,739,543
[45] Date of Patent: Apr. 26, 1988

[54] PUSH PIN RETAINER

[75] Inventor: Charles F. Harris, Jr., Ypsilinti, Mich.

[73] Assignee: Ford Motor Company, Dearborn, Mich.

[21] Appl. No.: 59,093

[22] Filed: Jun. 8, 1987

[51] Int. Cl.⁴ .................... F16B 19/00; F16B 13/04
[52] U.S. Cl. ........................................ 24/297; 24/453; 411/508
[58] Field of Search ................ 24/297, 289, 292, 291, 24/453; 411/508, 509, 510; 403/211

[56] References Cited

U.S. PATENT DOCUMENTS

| | | | |
|---|---|---|---|
| 2,758,498 | 8/1956 | Johnson | 411/508 |
| 3,722,037 | 3/1973 | Jaeger | 411/508 |
| 3,727,271 | 4/1973 | Znamirowski | 411/508 |
| 3,810,279 | 5/1974 | Swick et al. | |
| 4,431,355 | 2/1984 | Junemann | 411/508 |
| 4,627,760 | 12/1986 | Yagi et al. | 24/297 |
| 4,644,614 | 2/1987 | Mizusawa | 24/453 |

Primary Examiner—Victor N. Sakran
Attorney, Agent, or Firm—Daniel M. Stock; Clifford L. Sadler

[57] ABSTRACT

A push pin fastener for securing light automotive trim components to portions of an automobile includes a base portion and a shank extending perpendicularly from the base portion and cantileverly supporting a pair of triangularly shaped locking legs from the free end of the shank. The locking legs are foldably deflectable and are supported on a bridge portion between a pair of straight locking legs extending from the base portion.

11 Claims, 2 Drawing Sheets

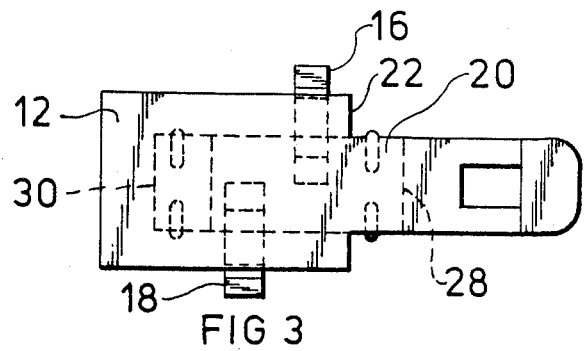
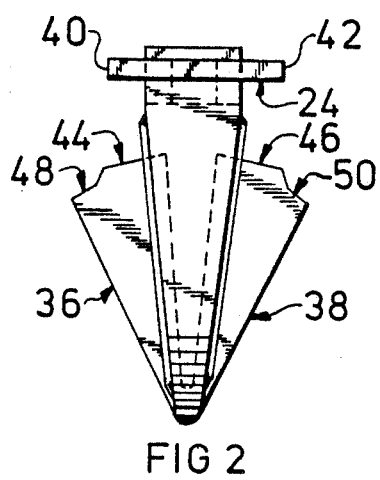
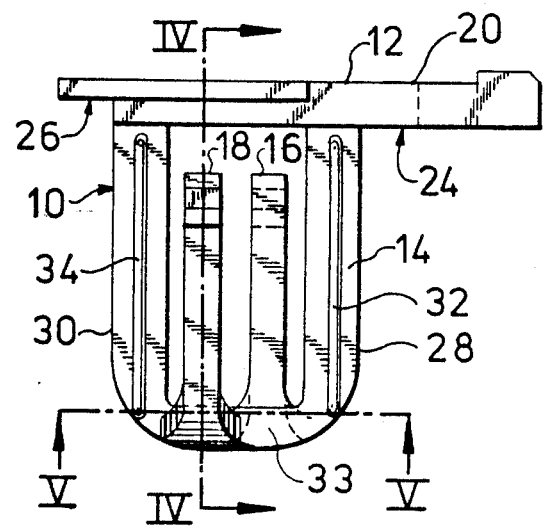
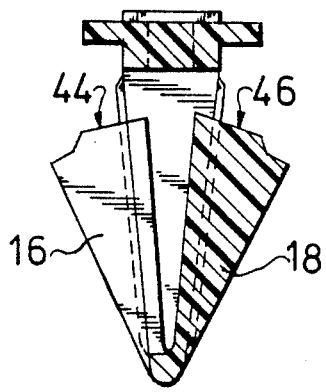
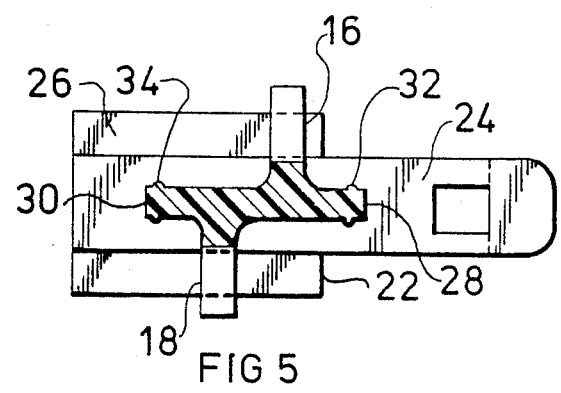

U.S. Patent Apr. 26, 1988 Sheet 2 of 2 4,739,543
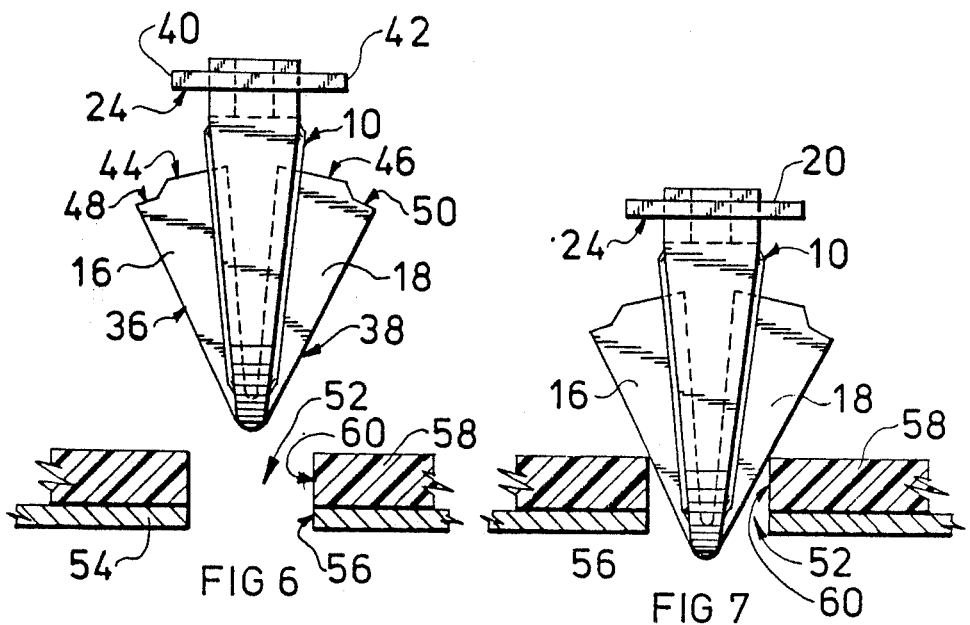
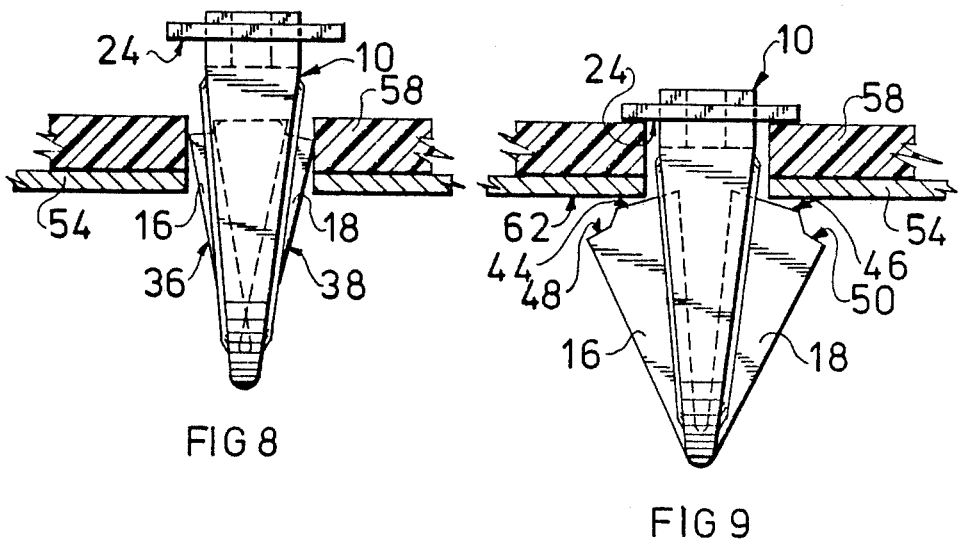
FIG 6
FIG 7
FIG 8
FIG 9

PUSH PIN RETAINER

BACKGROUND OF THE INVENTION

The present invention relates to non-threaded retainers and more specifically to one-piece molded retainers adapted for use in the assembly of automotive vehicle bodies.

There is a great need in the assembly of automobiles to effect retention of relatively light components throughs the use of non-threaded fasteners which are generally specified to reduce the time required to secure the device for which the retainer is specified. Most of these retainers are formed as injection molded parts having a barbed shank whose diameter exceeds the bounds of the cooperating aperture in the vehicle body into which the fastener is inserted and a head of greater diameter. Retention is effected by inserting the shank into the aperture, deflecting the barbs during insertion and permitting the barbs relaxation into a vacant area This area is typically the other side of the wall in which the aperture is formed. The retainer is configured to define a shank diameter greater than the aperture to resist removal.

A significant disadvantage in using retainers of this sort is that in order to achieve high resistance to pullout removal of such a retainer, the retaining barbs or other locking device must be sized and shaped in a manner which adds to the resistance in insertion, typically the thickening or angling of barbs of the type shown in U.S. Pat. No. 3,810,279.

SUMMARY OF THE INVENTION

It is accordingly an object of the present invention to provide a non-threaded retainer which provides minimal resistance to insertion while providing significant resistance to removal. It is a further object of the present invention to provide these functions in a fastener which is unitarily formed such as in providing a one-piece injection molded part.

These objects are achieved in the retainer of the present invention by providing a retainer having an enlarged head portion with a depending shank portion extending from it which includes a pair of locking arms cantileverly supported by the end of the shank distal the head. The arms are configured to be canted outward from the main axis of the shank to present outer surfaces radially spaced from the axis of the shank which are positioned beyond the internal surfaces of the aperture into which the retainer may be inserted. Insertion of the shank into the aperture compresses the locking legs readily to allow insertion and passage through the wall in which the aperture is formed. This allows relaxation of the legs outwardly to prevent removal. At least one abutting cam surface is provided on the free end of each locking leg for engagement with the wall.

BRIEF DESCRIPTION OF THE DRAWINGS

These and other objects and features will become apparent to those skilled in the automotive body arts upon reading the following description with reference to the attached in which:

FIG. 1 is a side elevational view of the push pin retainer of the present invention;

FIG. 2 is a left-side view of the retainer of FIG. 1;

FIG. 3 a top view of the retainer of FIG. 1;

FIG. 4 is a cross-sectional view taken along line IV—IV of FIG. 1;

FIG. 5 is a cross-sectional view taken along lines V—V of FIG. 1;

FIG. 6 is an exploded view of the retainer prior to insertion body panel aperture;

FIG. 7 is a view similar to FIG. 6 showing the retainer as insertion begins;

FIG. 8 is a view similar to FIG. 6 showing the retainer during insertion; and

FIG. 9 is a view similar to FIG. 6 showing the retainer after insertion.

DESCRIPTION OF THE PREFERRED EMBODIEMNT

Turning now to the drawings, and in particular to FIG. 1 thereof, a unitary push pin retainer 10 is illustrated as comprising an enlarged head portion 12 and a shank portion 14 extending perpendicularly from head portion 12. The shank portion 14 is illustrated as including a pair of locking legs 16,18. The head portion 12 is here illustrated as being formed as a generally rectangular shape and includes a tab portion 20 extending perpendicularly outwardly from one side 22 thereof. This shape is particularly advantageous in one preferred embodiment of the present invention in which the shape cooperates with corresponding surfaces defined on an automobile body portion to effect component retention while securing the retainer 10 against rotation when assembled. Other shapes are possible for the head 12 however without departing from its essential feature. That is, the head 12 must describe bearing surfaces such as indicated at 24,26 which extend outwardly beyond the periphery of an aperture into which the retainer 10 is inserted.

The shank portion 14 is unitarily formed with the head portion as a multi-legged structure having at least the previously mentioned locking legs 16,18 and a pair of support legs 28,30 positioned outward with respect to the locking legs 16,18 and joined with them through a bridge portion 32 positioned remote from the head portion 12. Both the support legs 28,30 and the locking legs 16,18 may be formed to define a generally triangular cross-section in at least one plane as is best shown in FIG. 2 to facilitate insertion of the retainer 10 into an aperture.

The support legs 28,30 are configured to provide a rigid member extending from the head 12. This function is enhanced by the provision of strengthening ribs such as indicated at 32,34 in FIGS. 1 and 5. Another important function of the ribs 32,34 is their provision of a reduced surface area for sliding engagement during insertion in close fitting apertures. This reduces the effort required for insertion.

The locking legs on the other hand are constructed to impart structural rigidity to the retainer 10 only in the axial sense through providing resistance to the removal of the retainer 10 from an aperture wall into which the retainer is inserted. The locking legs 16,18 are configured to provide significant flexibility in directions normal to the major access of the shank portion 14 of the retainer 10. The locking legs 16,18 are cantileverly supported on the bridge portion 32 and are molded to extend radially outwardly in opposite directions from the central axial plane of the shank portion 14 as can be clearly seen in FIG. 2. The outer surfaces 36,38 of locking legs 16, 18 respectively extend at their free ends to beyond the outer surfaces 40,42 of the head portion 12 lying directly above them. Locking surfaces 44,46 extend inwardly from locking leg outer surfaces 36,38 respectively and may include secondary locking surfaces 48,50 respectively. The spacing of the legs 16,18 and consequently the locking surfaces 44,46, 48,50 from the bearing surfaces 24 of the head portion 12 is routinely determined for specific applications to provide for the height of the article to be retained.

OPERATION OF THE PREFERRED EMBODIEMNT

In the series of drawings in FIGS. 6-9 the simple and advantageous assembly of the push pin retainer 10 of the present invention is effectively illustrated.

FIG. 6 illustrates the retainer 10 of FIG. 2 positioned adjacent an aperture 52 such as might be formed in an automobile vehicle to be assembled. The structural base such as an automotive body panel such as is indicated at 54 may include an aperture 56 and a component such as a plastic housing indicated in part at 58 may include an aligned aperture 60 thus forming the insertion aperture here referred to by the numeral 52. As the locking legs 16,18 of the retainer 10 contact the inner periphery of the aperture 52, insertion motion is resiliently resisted by the locking legs 16,18. The diverging triangular orientation of the opposed legs 16,18 facilitates insertion into the aperture 52, as do the ribs 32,34 in assemblies in which the aperture 52 is close fitting; and the legs 16,18 are folded inwardly with respect to the shank portion 14 as insertion progresses as may best be seen in FIG. 8. When the locking surfaces 44,46 of locking legs 16,18 respectively have passed beyond the inner surface 62 of the body panel 54 the locking legs 16,18 spring back outwardly to an extent beyond the inner periphery of the aperture 52. Withdrawal of the retainer 10 therefore is effectively resisted since withdrawal is resisted by the legs 16,18 acting in columnar fashion against the bridge portion 32 which is in turn connected through support legs 28,30 to the base portion 12. In effect, removal is impossible without destruction of the retainer 10 unless the legs 16,18 are compressed to permit withdrawal through the aperture 52.

Supplementary locking surfaces such as those indicated at 48,50 may be employed in certain applications to permit a single push pin fastener 10 to accommodate a variety of aperture dimensions and retained part thicknesses.

While only a single embodiment of the push pin retainer of the present invention has been described others are possible without departing from the scope of the appended claims.

What is claimed is:

1. A push pin retainer for insertion into an aperture in a body panel of an automobile, the retainer comprising:
   a generally rectangular base portion;
   a shank portion unitarily formed of generally triangular shape with the base portion and extending perpendicularly therefrom and defining a longitudinal axis extending in a direction parallel to the central axis of the aperture;
   a pair of locking legs, each cantileverly supported from the free end of the shank, the locking legs being formed of generally triangular shape substantially identical to the shape of the shank portion and being foldable to deflect between a relaxed locking condition in which portions of the legs extend radially outwardly from the axis of the shank beyond the inner periphery of the aperture and an inner compressed condition permitting sliding insertion through the aperture.

2. A retainer as defined in claim 1, wherein the locking legs each include flat primary locking surfaces formed on the free ends thereof.

3. A retainer as defined in claim 2, wherein the legs further comprises secondary locking features formed adjacent the primary locking features proximate the radial outer terminus of the locking legs.

4. A retainer as defined in claim 1, wherein the shank portion comprises a generally U-shaped portion having a pair of spaced support legs interconnected by a bridge portion, the locking legs extending in cantilever fashion from the bridge portion and spaced apart therealong.

5. A retainer as defined in claim 4, wherein the support legs include ribs extending longitudinally thereof and integrally formed therewith.

6. A push pin retainer for insertion into an aperture in a body panel of an automobile, the retainer comprising:
   a generally rectangular base portion;
   a shank portion unitarily formed with the base portion and extending perpendicularly therefrom and defining a longitudinal axis extending in a direction parallel to the central axis of the aperture, the shank portion including a pair of straight support legs in the plane of the longitudinal axis and joined at their ends distal the base portion by a bridge portion;
   a pair of locking legs, each cantileverly supported from the free end of the bridge portion, and spaced apart thereby, the locking legs being formed of generally triangularly shape and being foldable to deflect between a relaxed locking condition in which portions of the legs extend radially outwardly from the axis of the shank beyond the inner periphery of the aperture and an inner compressed condition received within the shank portion permitting sliding insertion through the aperture.

7. A retainer as defined in claim 6, wherein the locking legs each include flat primary locking surfaces formed on the free ends thereof.

8. A retainer as defined in claim 7, wherein the locking legs further comprise secondary locking features formed adjacent the primary locking features proximate the radial outer terminus of the locking legs.

9. A retainer as defined in claim 6, wherein the support legs include ribs extending longitudinally thereof and integrally formed therewith.

10. A retainer as defined in claim 6, wherein the shank portion is formed to define a generally triangular shape substantially identical to the shape of the locking legs to receive the locking legs when the legs are deflected to the compressed position.

11. A push pin retainer for insertion into an aperture in a body panel of an automobile, the retainer comprising:
    a generally rectangular base portion;
    a shank portion unitarily formed of generally triangular shape with the base portion and extending perpendicularly therefrom and defining a longitudinal axis extending in a direction parallel to the central axis of the aperture, the shank portion including a pair of straight support legs in the plane of the longitudinal axis and joined at their ends distal the base portion by a bridge portion;
    a pair of locking legs, each cantileverly supported from the free end of the bridge portion, and spaced apart thereby, the locking legs being formed of generally triangular shape substantially identical to the shape of the shank portion and being foldable to deflect between a relaxed locking condition in which portions of the legs extend radially outwardly from the axis of the shank beyond the inner periphery of the aperture and an inner compressed condition permitting sliding insertion through the aperture.

* * * * *